US008369405B2

(12) United States Patent
Shi et al.

(10) Patent No.: US 8,369,405 B2
(45) Date of Patent: Feb. 5, 2013

(54) METHOD AND APPARATUS FOR MOTION COMPENSATED FRAME RATE UP CONVERSION FOR BLOCK-BASED LOW BIT RATE VIDEO

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1440 days.

(21) Appl. No.: 11/122,678

(22) Filed: May 4, 2005

(65) Prior Publication Data
US 2005/0265451 A1    Dec. 1, 2005

Related U.S. Application Data

(60) Provisional application No. 60/568,328, filed on May 4, 2004, provisional application No. 60/664,679, filed on Mar. 22, 2005.

(51) Int. Cl.
*H04N 7/12* (2006.01)
(52) U.S. Cl. .............. 375/240.16; 375/240; 375/240.01; 375/240.12; 375/240.15
(58) Field of Classification Search .................. 375/240, 375/240.01, 240.12, 240.15, 240.16; 382/240
See application file for complete search history.

(56) References Cited

U.S. PATENT DOCUMENTS

| | | | |
|---|---|---|---|
| 3,670,096 A | 6/1972 | Candy et al. | |
| 5,168,394 A | 12/1992 | Sasho | |
| 5,198,902 A | 3/1993 | Richards et al. | |
| 5,387,947 A | 2/1995 | Shin | |
| 5,394,196 A | 2/1995 | Robert | |
| 5,784,107 A | 7/1998 | Takahashi | |
| 5,844,616 A | 12/1998 | Collet et al. | |
| 5,995,154 A | 11/1999 | Heimburger | |
| 6,008,865 A | 12/1999 | Fogel | |
| 6,043,846 A | 3/2000 | Shen et al. | |
| 6,101,220 A | 8/2000 | Ando | |
| 6,192,079 B1 | 2/2001 | Sharma et al. | |
| 6,208,760 B1 | 3/2001 | De Haan et al. | |
| 6,229,570 B1 | 5/2001 | Bugwadia et al. | |

(Continued)

FOREIGN PATENT DOCUMENTS

| | | |
|---|---|---|
| CL | 153-07 | 1/2007 |
| CL | 786-07 | 3/2007 |

(Continued)

OTHER PUBLICATIONS

Sung-Hee Lee et al, "Weighted-Adaptive Motion Compensated Frame Rate Up-Conversion", IEEE Transactions on Consumer Electronics, IEEE Service Center, New York, NY, US, vol. 49, No. 3, Aug. 1, 2003, pp. 485-492.*

(Continued)

*Primary Examiner* — Allen Wong
(74) *Attorney, Agent, or Firm* — Stanton Braden (57) ABSTRACT

A method and apparatus for video frame interpolation using a current video frame, at least one previous video frame, and a set of transmitted motion vectors is described. A first set of motion vectors is created as a function of the set of transmitted motion vectors. An intermediated video frame is identified, where the intermediate video frame having a plurality of non-overlapping blocks. Each non-overlapping block is assigned with at least one motion vector chosen from the first set of motion vectors to create a set of assigned motion vectors. Then, a second set of motion vectors is created as a function of the assigned set of motion vectors. A video frame is generated using the second set of motion vectors.

56 Claims, 7 Drawing Sheets

U.S. PATENT DOCUMENTS

| | | | |
|---|---|---|---|
| 6,229,925 | B1 | 5/2001 | Alexandre et al. |
| 6,330,535 | B1 | 12/2001 | Yasunaga et al. |
| 6,345,247 | B1 | 2/2002 | Yasunaga et al. |
| 6,404,901 | B1 | 6/2002 | Itokawa |
| 6,424,676 | B1* | 7/2002 | Kono et al. ............. 375/240.16 |
| 6,480,541 | B1 | 11/2002 | Girod et al. |
| 6,560,371 | B1* | 5/2003 | Song et al. ................. 382/240 |
| 6,597,738 | B1 | 7/2003 | Park et al. |
| 6,618,439 | B1 | 9/2003 | Kuo et al. |
| 6,625,333 | B1 | 9/2003 | Wang et al. |
| 6,654,420 | B1 | 11/2003 | Snook |
| 6,704,357 | B1* | 3/2004 | Ketcham ................. 375/240.01 |
| 6,728,317 | B1 | 4/2004 | Demos |
| 7,003,038 | B2 | 2/2006 | Divakaran et al. |
| 7,042,941 | B1 | 5/2006 | Laksono et al. |
| 7,075,986 | B2 | 7/2006 | Girod et al. |
| 7,116,716 | B2 | 10/2006 | Ma et al. |
| 7,215,710 | B2 | 5/2007 | Yamada et al. |
| 7,280,708 | B2 | 10/2007 | Song et al. |
| 7,457,471 | B2 | 11/2008 | Song et al. |
| 7,577,196 | B2 | 8/2009 | Ducloux et al. |
| 2004/0017852 | A1 | 1/2004 | Garrido et al. |
| 2005/0005301 | A1 | 1/2005 | Song et al. |
| 2006/0002465 | A1 | 1/2006 | Raveendran et al. |
| 2006/0018383 | A1 | 1/2006 | Shi et al. |
| 2006/0159359 | A1 | 7/2006 | Lee |
| 2006/0165176 | A1 | 7/2006 | Raveendran et al. |
| 2007/0064800 | A1 | 3/2007 | Ha |
| 2007/0230563 | A1 | 10/2007 | Tian et al. |
| 2007/0230564 | A1 | 10/2007 | Chen et al. |
| 2007/0230578 | A1 | 10/2007 | Shi et al. |
| 2008/0002862 | A1 | 1/2008 | Matsugu et al. |
| 2008/0112606 | A1 | 5/2008 | Lee et al. |

FOREIGN PATENT DOCUMENTS

| | | |
|---|---|---|
| EP | 0018856 A1 | 11/1980 |
| EP | 0782343 | 7/1997 |
| EP | 0881836 A1 | 12/1998 |
| EP | 1287492 A2 | 3/2003 |
| EP | 1357750 A2 | 10/2003 |
| EP | 1 369 820 A2 | 12/2003 |
| EP | 1369820 A2 * | 12/2003 |
| EP | 1383322 A2 | 1/2004 |
| EP | 1481546 A1 | 12/2004 |
| EP | 1617678 A2 | 1/2006 |
| GB | 2316568 A1 | 2/1998 |
| JP | 08191448 A | 7/1996 |
| JP | 08223536 A | 8/1996 |
| JP | 8256340 A | 10/1996 |
| JP | 10066033 A | 3/1998 |
| JP | 11-510937 | 9/1999 |
| JP | 2000134585 A | 5/2000 |
| JP | 2000-512091 | 9/2000 |
| JP | 2003515987 T | 5/2003 |
| JP | 2003274415 | 9/2003 |
| JP | 2003348596 A | 12/2003 |
| JP | 2004-112229 | 4/2004 |
| JP | 2005526457 A | 9/2005 |
| KR | 1019990082104 | 11/1999 |
| KR | 20030073254 A | 9/2003 |
| RU | 2 182 727 C2 | 5/2002 |
| RU | 2201654 C2 | 3/2003 |
| TW | 480885 B | 3/2002 |
| WO | WO92016071 A1 | 9/1992 |
| WO | WO9728507 A1 | 8/1997 |
| WO | WO0133864 A1 | 5/2001 |
| WO | WO2004025965 A1 | 3/2004 |
| WO | WO2006007527 A2 | 1/2006 |
| WO | WO2007115325 A2 | 10/2007 |

OTHER PUBLICATIONS

International Search Report-PCT/US05/015450, International Search Authority-European Patent Office- Sep. 14, 2005.
Written Opinion-PCT/US05/015450; International Search Authority-European Patent Office-Sep. 14, 2005.
International Preliminary Report on Patentability—PCT/US05/015450, International Search Authority—IPEA/US- Jul. 21, 2006.
A. Kaup et al.: "Efficient prediction of uncovered background in inter-frame coding using spatial extrapolation" in Proc. ICASSP, vol. 5, pp. 501-504, 1994.
G. Dane and T.Q. Nguyen,"Motion vector processing for frame rate up conversion" in IEEE international Conference on Acoustics, Speech, and Signal Processing, pp. 309-312, May 2004.
R. Thoma et al.: "Motion compensating interpolation considering covered and uncovered background", Signal Processing: Image Compression 1, pp. 191-212, 1989.
T. Kuo et al.: "Motion-compensated interpolation for low bit-rage video quality enhancement" in Proc. SPIE Applications of Digital Image Processing, vol. 3460, pp. 277-288, 1998.
"Advanced Video Coding for Generic Audiovisual Services," ITU-T Standard Pre-Published (P), International Telecommunication Union, GENEVA, N. H264 3/5, Mar. 1, 2005, XP002448756.
"Rate-Constrained Coder Control and Comparison of Video Coding Standards," IEEE Transactions On Circuits And Systems For Video Technology, Vol. 13, No. 7, pp. 688-703, (Jul. 2003).
Flierl et al., "Generalized B Pictures and the Draft H.264/AVC Video-Compression Standard", IEEE Trans. Circuit and Systems for Video Technology, vol. 13, No. 7, pp. 587-597, 2003.
Fukunaga et al.: "MPEG-4 Video Verification Model Version 16.0", International Organization for Standardization, vol. N3312, Mar. 2000 (Mar. 2000), pp. 1-380, XP000861688 Section 3.7, pp. 81-88.
Gallant et al.: "Efficient scalable DCT-based video coding at low bit rates", Image Processing, 1999. IC 99. International Conference on Kobe, Japan 24-28 Oct. 1999, Piscataway, NJ, USA, IEEE, US, vol. 3, Oct. 24, 1999, pp. 782-786, XP010368741.
Ghandi M. et al., Layered H.264 Video Transmission with Hierarchical QAM [Online] May 1, 2005, pp. 1-17, xp002446009, URL:http://mandi/ghandi.ws/papers/jvcir06.
Liu et al., "Adaptive Video Multicast over the Internet", IEEE Computer Society, 2003, pp. 22-33.
Liu et al.: "MCI-Embedded Motion-Compensated Prediction for Quality Enhancement of Frame Interpolation", Proceedings of the SPIE—The International Society for Optical Engineering, Multimedia Systems and Applications III, vol. 4209, Nov. 6, 2000, pp. 251-261, XP002351712, Boston, MA, USA, 2001, abstract, Section 1, pp. 251-252, Section 2, pp. 253-254, Section 4, pp. 256-257.
Puri et al.: "An lnterframe Coding Scheme for Packet Video", Proceedings of the SPIE, Belingham, VA, US, vol. 1199, no. Part 3, Nov. 8, 1989, pp. 1610-1619, XP000568683, abstract section 3, p. 1611 Section 5, pp. 1612-1613 with figures 2 and 4.
Puri et al.: "Video Coding with Motion-Compensated Interpolation for CD-ROM Applications", Signal Processing Image Communication, Elsevier Science Publishers, Amsterdam, NL vol. 2, No. 2, Aug. 1, 1990, pp. 127-144, XP000243473 abstract section 4, pp. 130-132.
Sasai et al.: "B-Picture Coding with Motion-Compensated Frame Rate up Conversion", Proceedings of the SPIE—The International Society for Optical Engineering, Image and Video Communications and Processing 2005, vol. 5685, Jan. 18, 2005, p. 792-800, XP002351713 San Jose, CA, USA, 2005 abstract Sections 3.1 and 3.3.
Schwarz H et al., "MCTF and Scalability Extension of H. 264/AVC," Internet Citation, [Online] Dec. 15, 2004, XP002368924, URL: http;//ip.hhi.de/imagecom_G1/savcw/documents/PCS2004.
Schwarz H. et al., "Combined Scalability Support for the Scalable Extension of H.264/AVC5," Multimedia and Expo, 2005. ICME 2005. IEEE International Conference on Ansterdam, The Netherlands, Jul. 6, 2006, pp. 446-449, XP010843292.
Sullivan et al.: "Rate-Distortion Optimization for Video Compression", IEEE Signal Processing Magazine, IEEE Service Center, Piscataway, NJ, US, vol. 15, No. 6, Nov. 1998, pp. 74-90, XP001064929, Sub-section "Distortion Measures", pp. 78-79 Sub-section "Optimization Techniques", ", pages 80-81 Sub-sub-section " Variable Block Sizes, p. 82, paragraph entitled "Case 1", p. 82 Sub-section "Intra/Inter/Skip Mode Decision", pp. 84-85 Sub-section "Comparison to Other Encoding Strategies", p. 87-88.
Telecommunication Standarization Sector of ITU: "Recommendation H.264 Advanced Video Coding for Generic Audiovisual Services," ITU-T Recommendations, International Telecommendation Union, Geneva, CH, no. H264, Mar. 2005.

Thomas Wiegand: "Joint Model No. 1, Revision 1 (JM-IRL)", ITU Study Group 16-Video Coding Experts Group, Dec. 3, 2001, pp. 1, 3-75, XP001086627 Section 5, pp. 40-44 Appendix I, pp. 50-57.

TIA-1099 "Forward Link Only Air Interface Specification for Terrestrial Mobile Multimedia Multicast" Aug. 2006.

Bruijn Def J. et al, Efficient video coding integrating MPEG-2 and picture-rate conversion, IEEE Transactions on Circuits and Systems for Video Technology, New York, vol. 48, No. 3, Aug. 2002, pp. 688-693.

Castagno et al., "A Method for Motion Adaptive Frame Rate Up-Conversion," IEEE Transactions On Circuits And Systems For Video Technology, IEEE Service Center, Piscataway, NJ, USA, vol. 6, No. 5, Oct. 1996, pp. 436-445, XP000627032.

Chen, Tao, "Adaptive Temporal Interpolation Using Bidirectional Motion Estimation and Compensation," Institute Of Electrical And Electronics Engineers: Proceedings 21002 International Conference On Image Processing, ICIP, Rochester, NY, Sep. 22-25, 2002, IEEE, US, vol. 2 or 3, pp. 313-316, XP010607971.

Inazumi Y., et al., "Estimation of the Optimal Frame Rate for Video Communications Under Bit-Rate Constraints, "Electronics & Communications in Japan, Part 1—Communications, Scripta Technica. New York, vol. 86, no. Dec. 2003, pp. 54-67.12, Pant.

Pyun J-Y, et al., "Scene-Adaptive Frame-Layer Rate Control for Low Bit Rate Video,"-IEICE Transactions on Fundamentals of Electronics, Communications and Computer Sciences, Institute of Electronics Information and Comm. Eng. Tokyo, JP, vol. E86-A, no. Oct. 10, 2003, pp. 2618-2622.

Sasai H., et al., "Frame-rate up-conversion using reliable analysis of transmitted motion information," Acousitcs,Speech, and Signal Processing, 2004. Proceedings. ICASSP '04, IEEE International Conference on Montreal, Quebec, Canada, vol. 5, May 17, 2004, pp. 257-260.

A.M. Tekalp, "Digital Video Processing", pp. 1-526, Oppenheim, ed, Prentice Hall Signal Processing Series, Upper Saddle River, NJ 1995.

Dane G., et al., "Encoder-Assisted Adaptive Video Frame Interpolation," Acoustics, Speech, and Signal Processing, 2005. Proceedings. (ICASSP '05). IEEE International Conference on, Philadelphia, PA, Piscataway, NJ, IEEE, vol. 2, Mar. 18, 2005, pp. 349-352.

Kim et al.,: "A new video interpolation technique based on motion-adaptive subsampling" IEEE Transactions on Consumer Electronics, IEEE Service Center, New York, U.S. Lnkd-D01:10.1109/30. 793602, vol. 45, no. 3, pp. 782-787, Aug. 1, 1999, pp. 782-787, XP011083800.

Sung-Hee Lee et al, Weighted-adaptive motion-compensated frame rate up-conversion , IEEE Transactions on Consumer Electronics, IEEE Service Center, New York, NY, US, vol. 49, No. 3, Aug. 1, 2003, pp. 485492, XP002290775, ISSN: 0098-3063, DOI: 10.1109/TCE. 2003.1233759.

Sung-Hee Lee et al, "Adaptive motion-compensated interpolation for frame rate up-conversion" IEEE Transactions on Consumer Electronics, vol. 48, No. 3, Aug. 2002, pp. 444-450.

Yoshiritsu Hatori et al. (written by), Digital Image Network, 1st edition, The Institute of Image Information and Television Engineers (edited by), Kabushiki Kaisha Koronasha, Dec. 25, 2002, pp. 22 to 23, ISBN: 4-339-01262-9.

Taiwan Search Report—TW094114433—TIPO—Oct. 26, 2011 (0401432TW).

* cited by examiner

METHOD AND APPARATUS FOR MOTION COMPENSATED FRAME RATE UP CONVERSION FOR BLOCK-BASED LOW BIT RATE VIDEO

CLAIM OF PRIORITY UNDER 35 U.S.C. §119

The present Application for Patent claims priority to Provisional Application No. 60/568,328 entitled "METHOD AND APPARATUS FOR MOTION COMPENSATED FRAME RATE UP CONVERSION FOR BLOCK-BASED LOW BIT-RATE VIDEO APPLICATION" filed May 4, 2004, and Provisional Application No. 60/664,679 entitled "METHOD AND APPARATUS FOR MOTION COMPENSATED FRAME RATE UP CONVERSION FOR BLOCK-BASED LOW BIT-RATE VIDEO" filed Mar. 22, 2005, and assigned to the assignee hereof and hereby expressly incorporated by reference herein.

BACKGROUND

1. Field

Embodiments of the invention relate generally to video compression, and more particularly, to a method and apparatus for frame rate up conversion for block-based low bit rate video.

2. Background

Low bit rate video compression is very important in many multimedia applications such as wireless video streaming and video telephony, due to the limited bandwidth resources and the variability of available bandwidth. Bandwidth adaptation video coding at low bit-rate can be accomplished by reducing the temporal resolution. In other words, instead of compressing and sending a 30 frames per second (fps) bit-stream, the temporal resolution can be halved to 15 fps to reduce the transmission bit-rate. However, the consequence of reducing temporal resolution is the introduction of temporal domain artifacts such as motion jerkiness that significantly degrades the visual quality of the decoded video.

To display the full frame rate at the receiver side, a recovery mechanism, called frame rate up conversion (FRUC), is needed to re-generate the skipped frames and to reduce temporal artifacts.

Many FRUC algorithms have been proposed, which can be classified into two categories. The first category interpolates the missing frame by using a combination of received video frames without taking the object motion into account. Frame repetition and frame averaging methods fit into this class. The drawbacks of these methods include the production of motion jerkiness, "ghost" images and blurring of moving objects when there is motion involved. The second category is more advanced, as compared to the first category, and utilizes the transmitted motion information, the so-called motion compensated (frame) interpolation (MCI).

Figure 1:
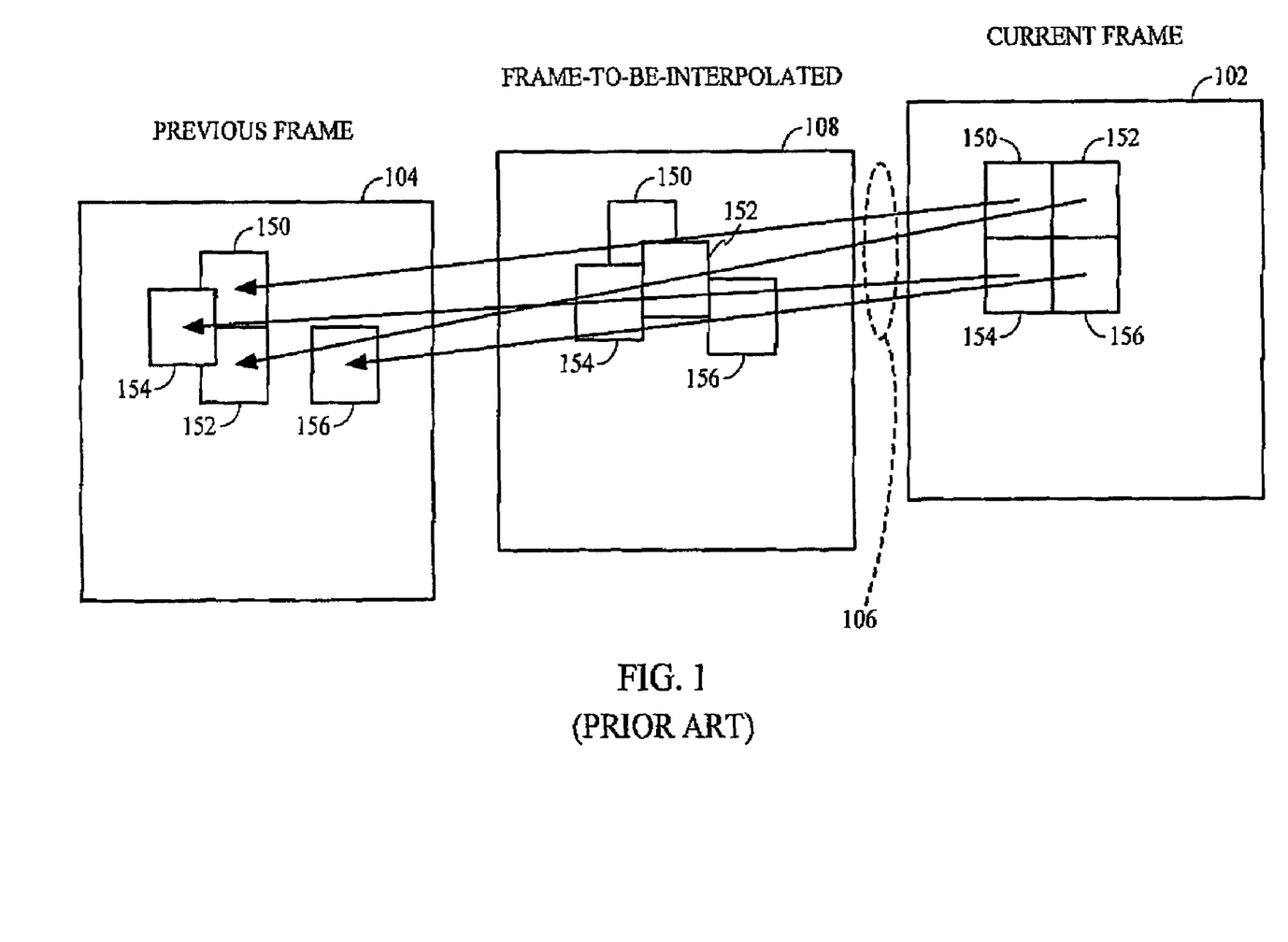
FIG. 1 is a figure illustrating the construction of an interpolated frame using motion compensated frame interpolation process.

As illustrated in prior art FIG. 1, in MCI, a missing frame 108 is interpolated based on a reconstructed current frame 102, a stored previous frame 104, and a set of transmitted motion vectors 106. Reconstructed current frame 102 is composed of a set of non-overlapped blocks 150, 152, 154 and 156 associated with set of transmitted motion vectors 106 pointing to corresponding blocks in stored previous frame 104. Interpolated frame 108 can be constructed in either a linear combination of corresponding pixels in current and previous frames; or nonlinear operation such as a median operation.

Figure 3:
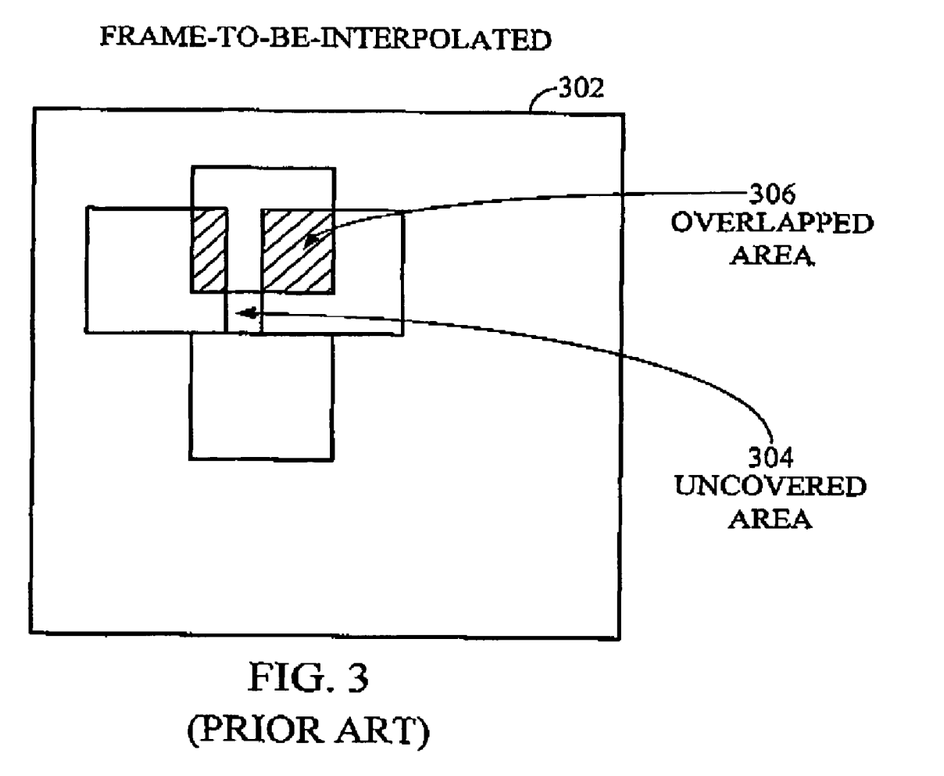
FIG. 3 is a figure illustrating overlapping and hole areas in an interpolated frame.

Block-based MCI introduces overlapped (multiple motion trajectories pass through this area) and hole (no motion trajectory passes through this area) regions in interpolated frames. As illustrated in FIG. 3, an interpolated frame 302 contains an overlapped area 306 and a hole area 304. The main reasons for the generation of these two types of unwanted areas are:

1. Moving objects are not under a rigid translational motion model.
2. The transmitted motion vectors used in the MCI may not point to the true motion trajectories due to the block-based fast motion search algorithms utilized in the encoder side.
3. The covered and uncovered background in the current frame and previous frames.

The interpolation of overlapped and hole regions is the major technical challenge in conventional block based motion compensated approaches. Median blurring and spatial interpolation techniques have been proposed to fill these overlapped and hole regions. However, the drawbacks of these methods are the introduction of the blurring and blocking artifacts, and also an increase in the complexity of interpolation operations.

SUMMARY

Embodiments herein provide a method and apparatus for creating an interpolated video frame using a current video frame, at least one previous video frame, and a set of transmitted motion vectors.

In one embodiment, the method includes the steps of smoothing the set of transmitted motion vectors; locating a motion vector for a center point of each non-overlapped block in the interpolated video frame; locating a center point for each block in the current video frame and the previous video frame; generating a set of output motion vectors; smoothing the set of output motion vectors; and, creating the interpolated video frame using the set of output motion vectors.

In another embodiment, the apparatus includes a computer readable medium having instructions stored thereon, the stored instructions, when executed by a processor, cause the processor to perform a method for creating an interpolated video frame. The method includes the steps of smoothing the set of transmitted motion vectors; locating a motion vector for a center point of each non-overlapped block in the interpolated video frame; locating a center point for each block in the current video frame and the previous video frame; generating a set of output motion vectors; smoothing the set of output motion vectors; and, creating the interpolated video frame using the set of output motion vectors.

In yet another embodiment, the apparatus includes a video frame processor receiving an incoming bit stream including a plurality of video frames. The video frame processor including a frame buffer, the frame buffer storing at least one previous frame and a current frame; a motion vector buffer, the motion vector buffer storing at least one set of motion vectors associated with previous frame and a plurality of transmitted motion vectors for the current frame; a first motion vector processor coupled to the motion vector buffer and the frame buffer, the first motion vector processor receiving the plurality of transmitted motion vectors and producing a first plurality of output motion vectors; a motion estimation module coupled to the first motion vector processor; a mode decision module; and a frame rate up converter.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Embodiments of the invention provide a method to avoid the creation of overlapped and hole-regions in an interpolated frame by use of motion estimation in a decoder. In one embodiment, by partitioning of the frame-to-be-interpolated into non-overlapped blocks and assigning each non-overlapped block a pair of motion vectors, the existence of unwanted overlapped or hole regions in the interpolated frame may be reduced. These motion vectors may be estimated using a motion estimation module in the decoder.

As mentioned previously, the performance of motion compensated frame interpolation algorithms largely depend on the accuracy of the motion vectors transmitted from the encoder. Transmitted motion vectors may not describe the true motion trajectory of its associated moving objects due to the following reasons:

1. The assumption of translational only, rigid-shaped motion model utilized in all block-based motion estimation algorithms is insufficient to describe objects moving naturally.

2. Motion estimation is a very computationally demanding process. Most video encoders use fast motion estimation algorithms to improve motion estimation speed at the cost of accuracy of the resulting motion vectors.

3. When covered or uncovered regions reside in the current or previous frames, motion estimation may result in unreliable vectors (i.e., motion vectors that do not accurately describe the motion of the block).

4. Many motion estimation techniques implement a pixel matching process using sum of absolute differences values (SAD)/sum of squared differences values (SSD) as distortion measures. However, SAD/SSD are statistical metrics and may not represent distortion in the human visual sense. Hence such motion estimation may not represent the true motion direction.

5. Many motion estimation algorithms are optimized from a rate minimization perspective and not from a perceptive quality point of view.

Blocked-based MCI attempts to solve the problem of the uncertainty of post-compression motion vectors as errors in an interpolated frame is directly related to the motion vector error variance. By applying motion vector smoothing techniques, the blocking artifacts in interpolated frames that are caused by outlier motion vectors will be reduced. In one embodiment, the system described herein also reduces blurring by performing median operations on a motion vector level instead of the pixel level.

Figure 4:
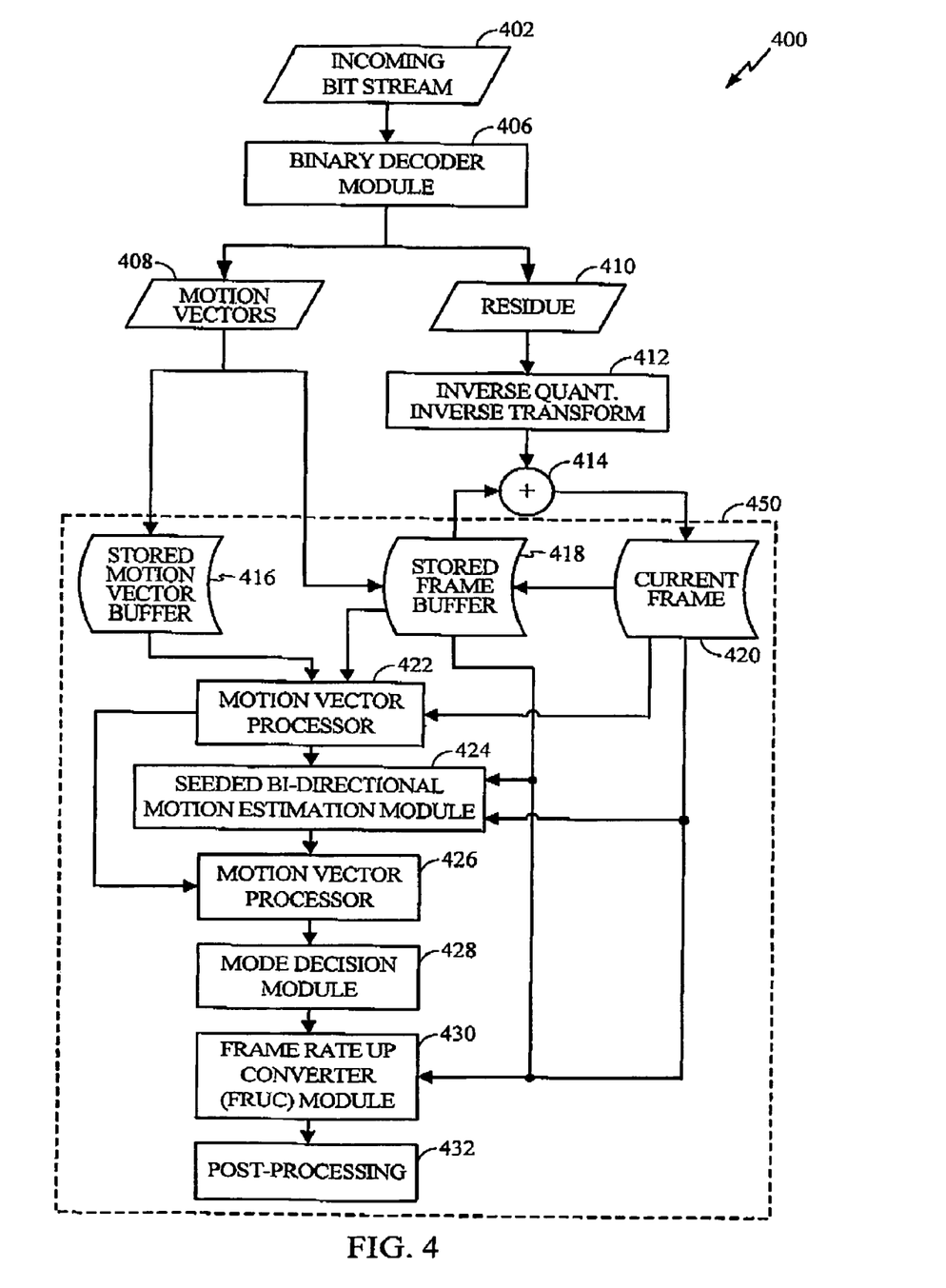
FIG. 4 is a block diagram of a FRUC system.

FIG. 4 is a block diagram of a FRUC system 400 that receives an incoming bit stream 402 and uses a binary decoder 406 to extract: (1) a set of motion vectors 408, which is placed in a stored motion vector buffer 416; and, (2) a residue. Residue 410 is operated on by an inverse quantization/inverse transform module 412, the result of which is combined with a previous frame stored in a stored previous frame buffer 418 to generate a current frame. The current frame is stored in a current frame buffer 420. A sub-portion 450 of FRUC architecture 400, including stored motion vector buffer 416, stored frame buffer 418, and current frame buffer 420, contains the specific functional modules related with implementing one embodiment. Specifically, sub-portion 450 include a motion vector processor 422, a seeded bidirectional motion estimation module 424, a second motion vector processor 426, a mode decision module 428, a frame rate up converter (FRUC) module 430, and a post-processing unit 432. The operation of the modules in sub-portion 450 is further described below in connection with the description of FIGS. 5-7.

Figure 7:
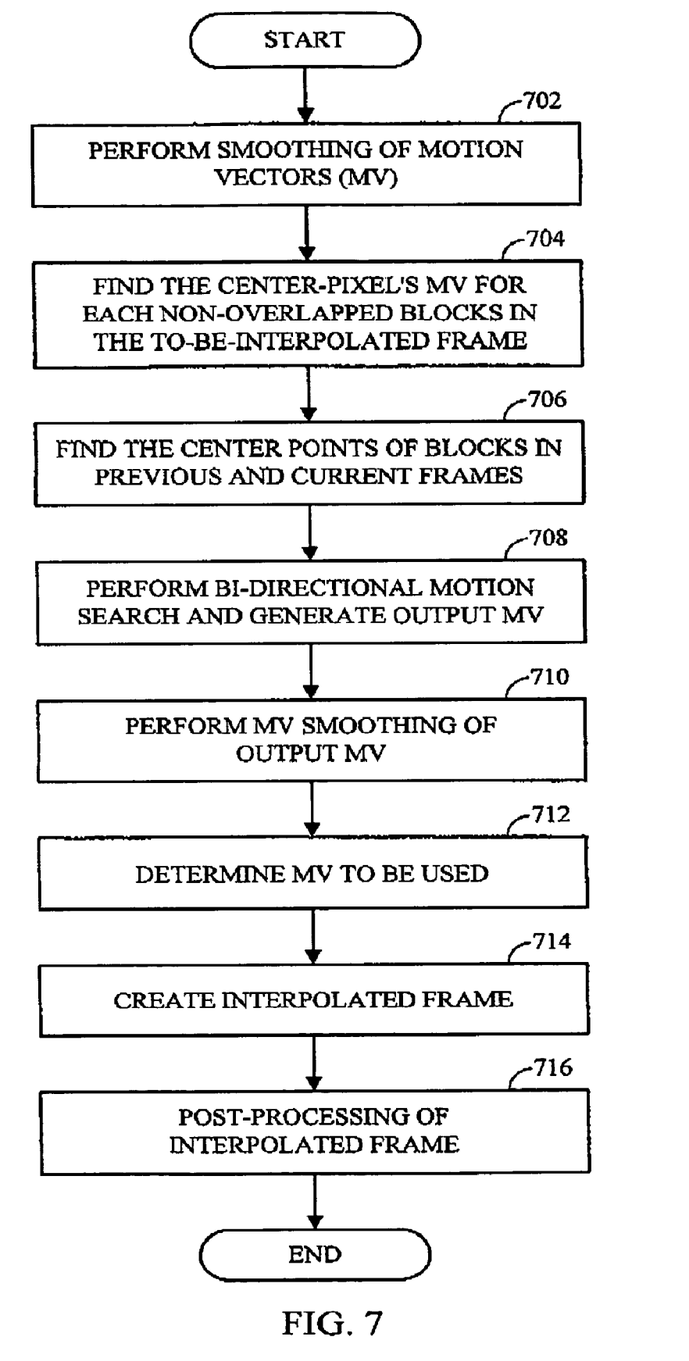

FIG. 7 is a flow diagram of the operation of FRUC architecture 400 in accordance with one embodiment. Beginning in step 702, motion vector processor 422 performs a motion vector smoothing operation of the transmitted motion vectors from the current and previous frames that are stored in stored motion vector buffer 416. Referring back to FIG. 5, where motion vector processor 422 is further detailed, motion vector processor 422 receives motion vectors from stored motion vector buffer 416 as an input. In one embodiment, the input motion vectors are the motion vectors of the current decoded frame. In another embodiment, the input motion vectors include motion vectors from both the current frame and any previously decoded frames, which provides a more realistic and flexible model for motion prediction. The smoothing operation, as further described herein, involves the normalization of outlier motion vectors in the set of transmitted motion vectors. In one embodiment, a first set of motion vectors is generated based on a function of the set of transmitted motion vectors, where the set of transmitted motion vectors is first partitioned into two portions, and the first portion of motion vectors is modified based on the second portion of the motion vectors such as based on a median operation, as further described below.

Figure 5:
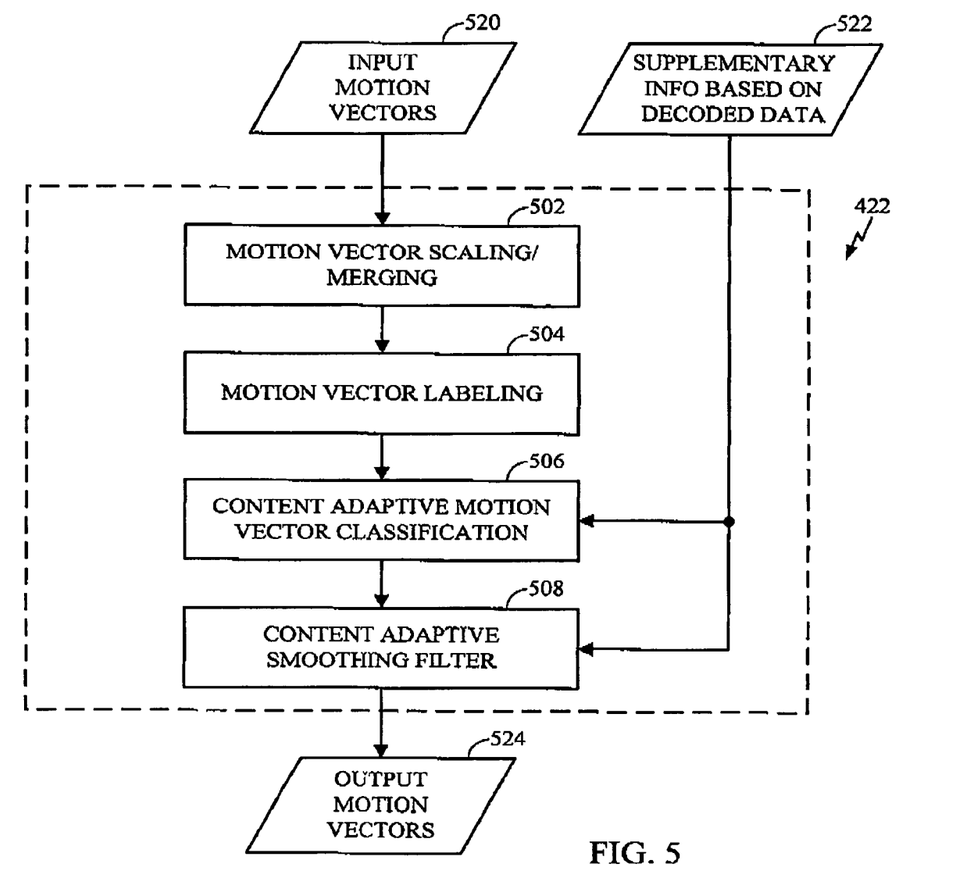
FIG. 5 is a block diagram of a motion vector processor in the FRUC system.

By combining the current frame's motion vector and a previous frame's motion vector, a constant motion model can be extended to include motion acceleration as the difference in the magnitude of these motion vectors may be compared to derive acceleration. A more flexible motion model may provide more accurate motion trajectory creation for the frame-to-be-interpolated. When the previous frame's motion vector is reversed (also referred to as an extrapolated motion vector), the reversed motion vector will point from the previous frame to the current frame, and may be used as the backward motion vector. In on embodiment, if the motion is constant, the backward motion vector and the forward motion vector (the current frame's motion vector) should be aligned with each other and pointing in opposite directions. If the forward and backward motion vectors are not aligned, the difference will be assumed to be caused by motion acceleration. After the motion vector smoothing operation is completed, operation then continues with step 704.

Motion vector processor 422 includes a motion vector scaling module 502. Motion vector scaling module 502 performs the scaling of an input motion vector based on the distances of the frame-to-be-interpolated as between the current and previous frames, and also takes into account a calculated motion acceleration. In addition, motion vector processor 422 provides a merging function for video codecs that support variable block-size motion vectors. One such standard is the H.264 standard, as promulgated by the International Telecommunications Union, Telecommunications Standardization Sector (ITU-T), which supports motion vectors of 16×16, 16×8, 8×16, 8×8, 8×4, 4×8, and 4×4 shapes. The merging function merges several small block-size motion vectors into a larger block-size motion vector. Although the preferred size of the shape that is arrived at after the merging function is content dependant, in one embodiment, an 8×8 block size is used for the merging function. In one embodiment, the merging function is implemented as an average function. For the linear motion (constant speed) model, the scaled motion vector's magnitude is proportional to the current motion vector's magnitude with regards to the distance ratio between the frame-to-be-interpolated to the current frame and the current frame to the previous frame, while its direction is the same as that of the current frame's motion vector. For the non-linear motion (motion acceleration) model, the direction and the magnitude of the scaled motion vector depend both on the distance of the frame-to-be-interpolated between the current frame and previous frame; and the calculated motion acceleration. In another embodiment, the merging function is implemented as a median function. In yet another embodiment, the merging function is implemented as a weighted sum function. In still yet other embodiments, different functions may be combined to implement the merging function. It should be noted that t embodiments of the invention is also applicable to encoder assisted FRUC (EA-FRUC) techniques, where the encoder is configured to send extra information to assist the FRUC module in the decoder. For example, the encoder can send motion vectors, coefficient residues, or FRUC instructions for macroblocks that are "difficult" with respect to FRUC operations.

A motion vector labeling module 504 processes the scaled input motion vector from motion vector scaling module 502 to classify the scaled input motion vector. In one embodiment, the classification is based on data received from the other input to motion vector processor 422, which is supplementary information 522 from the decoded frame data. The classification information provided by supplementary information 522 include, but is not limited to, pixel classification, region of interests, variance of texture information, variation of luminance background value, etc. In addition to being used for motion vector classification, the information may provide guidance for the adaptive smoothing algorithm.

In one embodiment, depending on a motion vector's magnitude and direction, the input motion vector is labeled with a particular motion vector class. For example, if the motion vector is a small magnitude motion vector with regards to a predefined threshold, and the motion vector is pointing to North, then the motion vector is labeled as a Small North class. In one embodiment, the class includes North, South, West, and East (and combinations thereof) for direction, as well as Large, Medium and Small for magnitude. In other embodiments, other suitable classes may be used.

Figure 2:
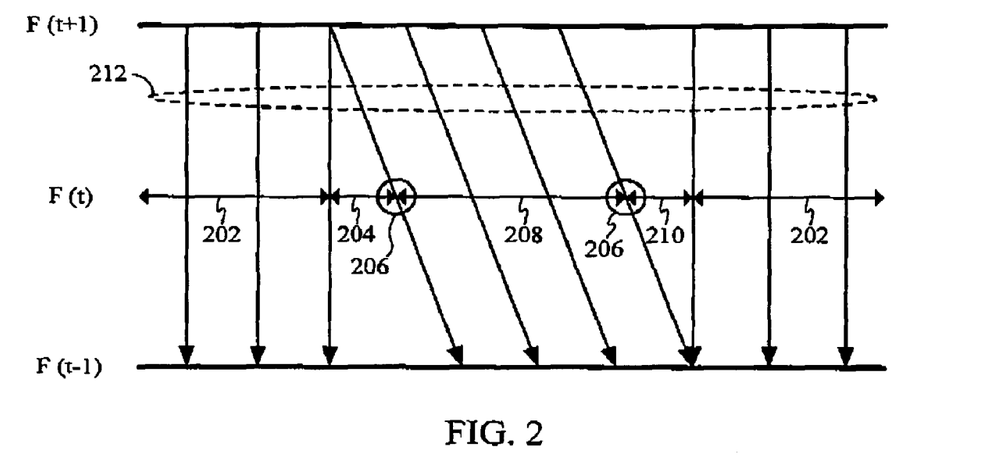
FIG. 2 is a figure illustrating the various classes assigned to pixels inside a video frame.

The content adaptive motion vector classification module 506 determines if the input motion vector is an outlier vector based on its label information from motion vector labeling module 504 and the content information from the decoded data. In one embodiment, the magnitude and direction of the current motion vector is compared to the magnitude and direction of other motion vectors surrounding the current vector. For example, if the current motion vector is labeled as a small motion vector (small magnitude) and is pointing South, while its neighboring motion vectors are labeled as large motion vectors (large magnitudes) and pointing North, then the current motion vector is marked as an outlier motion vector. In another embodiment, the class type of the pixel(s) to which the current motion vector is pointing is analyzed. FIG. 2 provides an illustration of the different classes of pixels, including a moving object (MO) 208, an uncovered background (UB) 204, a covered background (CB) 210, a static background (SB) 202 and edge 206 classes for MCI, where a set of arrows 212 denotes the motion trajectory of the pixels in the three illustrated frames F(t−1), F(t) and F(t+1). Specifically, in the context of MCI, each pixel inside a video frame can be classified into one of the above-listed five classes. Using the class type information, if the current motion vector is pointed from a Moving Object in the current frame to a Static Background in the previous reference frame, the current motion vector is marked as an outlier.

The content information from the decoded data and labeling of the processed input motion vector provide the needed inputs for an adaptive window size selection algorithm in a content adaptive smoothing filter 508. The removal of outlier motion vector(s) from the previous processing and overall low-pass filtering operation are performed based on the selected processing window. In one embodiment, the smoothing method implemented in content adaptive smoothing filter 508 of FIG. 5 is a median operation. In other embodiments, the median operation can be replaced by a mean (average) or Gaussian type filter. Further, other types of normalization/linear/non-linear filters may be used.

As further described below, the output motion vectors are used to predict the centers of the motion vectors in the seeded bi-directional motion estimation process. The key point in this step is the partitioning of the frame-to-be-interpolated into non-overlapped blocks. As described, the following steps determine the corresponding center pixels in the previous and current frames, and the motion-trajectory connecting them through which the center point of each block of the to-be-interpolated frame passes. Blocks of the same size as of the to-be-interpolated block is constructed around the center of pixels found in the previous and current frames. In one embodiment, the constructed blocks may overlap. In another embodiment, the constructed blocks may not overlap. In yet another embodiment, the constructed blocks may or may not overlap.

Referring again to FIG. 7, in step 704, for each non-overlapped blocks in the to-be-interpolated frame, the center-pixel's motion vector is determined by seeded bi-directional motion estimation module 424. The center-pixel's motion vector is shown by a seeded motion vector 620 in FIG. 6. Operation then continues with step 706.

Figure 6:
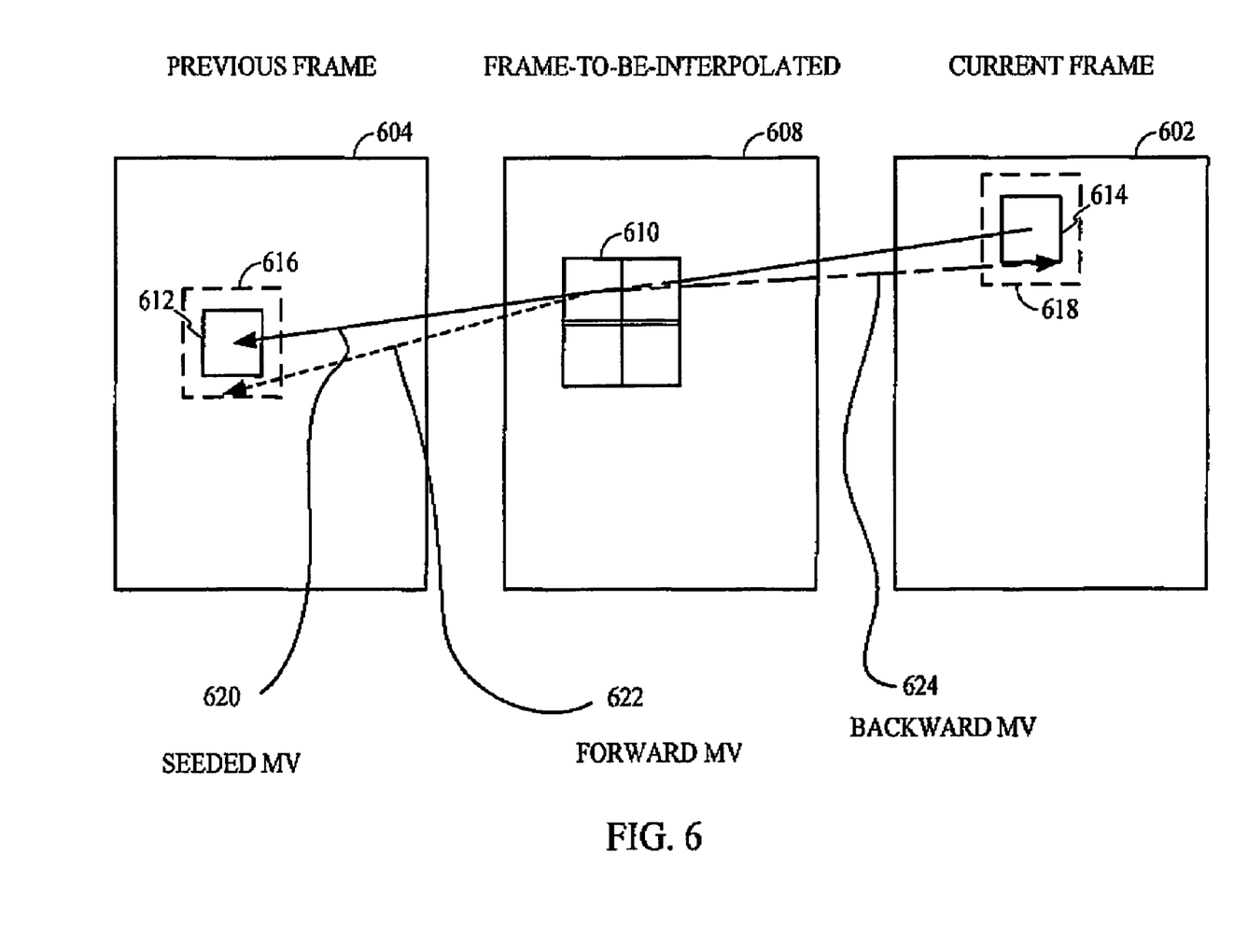
FIG. 6 is a figure illustrating a seeded bi-directional motion search performed by the FRUC system of FIG. 4; and, FIG. 7 is a flow diagram of the operation of the FRUC system.

In step 706, the bidirectional motion estimation module 424 determines the center points of the blocks in the previous and current frames. The blocks in the previous and current frames correspond to the non-overlapped blocks in the to-be-interpolated frame. The center point of the to-be interpolated block should lie on seeded motion vector 620.

In step 708, a bi-directional motion search is performed to find the forward and backward motion vectors centered around seeded motion vector 620. The search process is described with reference to FIG. 6, where a current frame 602, a previous frame 604 and a frame-to-be-interpolated 608 are shown. In one embodiment, search ranges 618 and 616 are adaptively assigned around the constructed blocks 614 and 612, respectively, in the current and previous frames, respectively. Bi-directional motion estimation is then performed between the current frame and previous frame centered around the constructed blocks. The resultant motion vector from current frame to previous frame is called the forward motion vector. This motion vector is scaled based on the distance of the to-be-interpolated frame from the current and previous frames and the estimated motion acceleration model. The scaled motion vector assigned to the to-be-interpolated block is labeled as forward motion vector. Similarly, a backward motion vector is also assigned to the to-be-interpolated block pointed from previous frame to the current frame. Referring to FIG. 6, the forward motion vector is illustrated by a forward motion vector 622 and the backward motion vector is shown as a backward motion vector 624. Thus, forward motion vector 622 is obtained by matching block 614 in the search area 616 with respect to minimizing a certain distortion metric. In one embodiment, the distortion metric to be minimized may be the sum of absolute value (SAD). In another embodiment, the distortion metric to be minimized is the sum of squared differences value (SSD). In other embodiments, other distortion metrics such as statistical and human visual systems (HVS)-based metrics may be used. Similarly, backward motion vector 624 is obtained by matching block 612 in the search area 618. In one embodiment, this operation can be limited to the "hole" regions in the to-be-interpolated frame to reduce complexity and lower required computation resources at the decoder.

In step 710, a second motion vector smoothing operation is performed on the output motion vectors generated from step 708 by second motion vector processor 426. In one embodiment, two separate motion vector processors are used because the inputs (motion vector fields) and the functionality performed by them are different. For example, motion vector processor 422 performs motion vector scaling and merging functionalities, as described above, while second motion vector processor 426 does not perform those functions. In one embodiment, second motion vector processor 426 performs a 3×3 median filtering on all input motion vectors, where the motion vectors of the eight blocks that are neighboring the current block are combined with the motion vector of the current block through a median operation. In another embodiment, as motion vector processor 422 can perform the functions provided by motion vector processor 426, the same hardware may be used to provide the second motion vector processing step. After the second motion vector smoothing operation is performed, operation continues with step 712.

The second stage of motion vector processing is applied to both the forward- and backward motion vectors of the to-be-interpolated frame obtained from bidirectional motion estimation module 424; for example, forward motion vector 622 and backward motion vector 624. The smoothed motion vectors are used in the motion compensated interpolation step. Based on the distortion criterion, a mode decision can be made for the to-be-interpolated block, as described below. An adaptive filter can be constructed for the bi-directional compensation cases. In one embodiment, the simplest filter is the bi-linear filter. Other filters may be used in other embodiments.

In step 712, mode decision module 428 determines which motion vectors are to be used for a particular block in the next step. In one embodiment, only the forward motion vector is used. In another embodiment, only the backward motion vector is used. In yet another embodiment, both the forward and backward motion vectors are used. In general, mode decision module 428 determines which motion vectors are used based on the following individual rules or the combination of them:

1) The distortion metric associated with each motion vector. For example, in motion estimation, where each motion vector has a SAD value, the SAD value may be used as the above-mentioned distortion metric. Using this distortion metric, a simple comparison can be performed to determine which motion vector is to be used. In one embodiment, the motion vector with the minimum distortion metric will be chosen.

2) The content classification information. Specifically, if the starting and ending points of one motion vector belong to different content classes, then the motion vector is not reliable and it will not be picked up for the final FRUC interpolation process.

3) The alignment of the two (forward- and backward-) motion vectors. If the two motion vectors are not aligned, then do not choose bi-motion vector interpolation, but pick the motion vector with the smaller distortion metric instead.

In step 714, motion compensated interpolation (Frame Rate Up Conversion) is performed by Frame Rate Up Converter unit 430. In one embodiment, the interpolation creates one new frame between the current and previous frames. In another embodiment, the interpolation may be performed on a FRUC for N>2 basis, where FRUC unit 430 will interpolate frames between more than 2 frames based on context/content and/or temporal redundancy. In general, when the temporal redundancy is high among neighboring frames—for example, where the motion field is regular and keeps a near constant shape; more frames can be skipped and the interpolated N>2 frames will still maintain a reasonable perceptive quality. Usually, small motion (context), or static background dominated sequence (for example, talk-show clips) are good candidates for N>2 FRUC. In N>2 FRUC, the N value may be content adaptively determined on the encoder side.

In step 716, post-processing unit 432 performs post-processing operations on the interpolated frame from step 712 to reduce any blocking artifacts. This last stage of the FRUC algorithm is the post-processing of the interpolated frame to remove the potential blocking artifact associated with block-based motion compensation. In one embodiment, overlapped block motion compensation (OBMC) is used. In another embodiment, de-blocking filtering can be employed for this purpose. Creation of the interpolated frame is completed at this step.

Current day applications typically require support for multiple codecs due to the availability of content in one or other form or due to network or operator requirements or due to co-existence of multiple video coding technologies (both standards based and proprietary). The advent of two-way and interactive video communications like video telephony, video camera and camcorder applications, particularly on handhelds, have created the need for both video encoder and decoder implementations on multimedia processors.

With the advance of hardware technology, video receiving devices are more computationally powerful. Some high-end devices have motion estimation hardware module inside the decoder. Under these circumstances, the involving of motion estimation in the FRUC process will optimally utilize the decoder hardware resources, and improve the visual quality of the interpolated frame.

The potential applications of the FRUC process described in various embodiments include the following:

1. Improving viewing experience by increasing the temporal resolution on the receiver device for low bit-rate applications.

2. Video format transcoding between different standards, or different levels of the same video coding standard.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments described herein. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The work "exemplary" is used exclusively herein to mean "serving as an example, instance, or illustration." Any embodiment described herein as "exemplary" is not necessarily to be construed as preferred or advantageous over other embodiments.

What is claimed is:

1. At least one processor configured to implement a method in a decoder for video frame interpolation using a current video frame, at least one previous video frame, and a set of transmitted motion vectors, the method comprising:
   creating a first set of motion vectors as a function of the set of transmitted motion vectors;
   identifying an intermediate video frame, the entire intermediate video frame having a plurality of non-overlapping blocks;
   assigning each non-overlapping block with at least one motion vector chosen from the first set of motion vectors to create a set of assigned motion vectors, the assigning comprising:
      determining a seeded motion vector passing through the non-overlapping block; and
      performing a motion vector search based on the seeded motion vector;
   creating a second set of motion vectors as a function of the assigned set of motion vectors; and,
   generating an interpolated video frame using the second set of motion vectors.

2. The at least one processor of claim 1, wherein creating the first set of motion vectors as a function of the set of transmitted motion vectors comprises:
   partitioning the set of transmitted motion vectors into a first portion of motion vectors and a second portion of motion vectors; and,
   modifying the first portion of motion vectors as a function of the second portion of motion vectors.

3. The at least one processor of claim 1, wherein determining the seeded motion vector comprises locating a motion vector passing through the center of the non-overlapping block.

4. The at least one processor of claim 1, wherein performing the motion vector search based on the seeded motion vector comprises performing a bi-directional motion vector search.

5. The at least one processor of claim 4, wherein performing the bi-directional motion vector search comprises:
   constructing a previous video frame search block in the at least one previous video frame;
   assigning a first search range to a portion of the current video frame; and,
   performing a search in the first search range for a first matching block to the previous video frame search block based on a first predetermined criteria.

6. The at least one processor of claim 5, wherein performing the bi-directional motion vector search comprises:
   constructing a current video frame search block in the current video frame;
   assigning a second search range to a portion of the at least one previous video frame; and, performing a search in the second search range for a second matching block to the current video frame search block based on a second predetermined criteria.

7. The at least one processor of claim 5, wherein performing the bi-directional motion vector search comprises locating a first motion vector based on the first matching block.

8. The at least one processor of claim 5, wherein the first predetermined criteria is based on a distortion metric.

9. The at least one processor of claim 8, wherein the first predetermined criteria is based on minimizing the distortion metric.

10. The at least one processor of claim 8, wherein the distortion metric is based on a sum of absolute differences between the first matching block and the previous video frame search block.

11. The at least one processor of claim 8, wherein the distortion metric is based on a sum of squared differences between the first matching block and the previous video frame search block.

12. The at least one processor of claim 8, wherein the distortion metric is based on a human visual system-based metric.

13. The at least one processor of claim 8, wherein the distortion metric is based on a statistical.

14. The at least one processor of claim 1, wherein the set of transmitted motion vectors comprise a plurality of current frame motion vectors and a plurality of previous frame motion vectors.

15. A method, implemented in a decoder, for video frame interpolation using a current video frame, at least one previous video frame, and a set of transmitted motion vectors, the method comprising:
creating a first set of motion vectors as a function of the set of transmitted motion vectors;
identifying an intermediate video frame, the entire intermediate video frame having a plurality of non-overlapping blocks;
assigning each non-overlapping block with at least one motion vector chosen from the first set of motion vectors to create a set of assigned motion vectors, the assigning comprising;
determining a seeded motion vector passing through the non-overlapping block; and
performing a motion vector search based on the seeded motion vector;
creating a second set of motion vectors as a function of the assigned set of motion vectors; and,
generating an interpolated video frame using the second set of motion vectors.

16. The method for video frame interpolation of claim 15, wherein creating the first set of motion vectors as a function of the set of transmitted motion vectors comprises:
partitioning the set of transmitted motion vectors into a first portion of motion vectors and a second portion of motion vectors; and,
modifying the first portion of motion vectors as a function of the second portion of motion vectors.

17. The method for video frame interpolation of claim 15, wherein determining the seeded motion vector comprises locating a motion vector passing through the center of the non-overlapping block.

18. The method for video frame interpolation of claim 15, wherein performing the motion vector search based on the seeded motion vector comprises performing a bi-directional motion vector search.

19. The method for video frame interpolation of claim 18, wherein performing the bidirectional motion vector search comprises:
constructing a previous video frame search block in the at least one previous video frame;
assigning a first search range to a portion of the current video frame; and,
performing a search in the first search range for a first matching block to the previous video frame search block based on a first predetermined criteria.

20. The method for video frame interpolation of claim 19, wherein performing the bidirectional motion vector search comprises:
constructing a current video frame search block in the current video frame;
assigning a second search range to a portion of the at least one previous video frame; and,
performing a search in the second search range for a second matching block to the current video frame search block based on a second predetermined criteria.

21. The method for video frame interpolation of claim 19, wherein performing the bi-directional motion vector search comprises locating a first motion vector based on the first matching block.

22. The method for video frame interpolation of claim 19, wherein the first predetermined criteria is based on a distortion metric.

23. The method for video frame interpolation of claim 22, wherein the first predetermined criteria is based on minimizing the distortion metric.

24. The method for video frame interpolation of claim 22, wherein the distortion metric is based on a sum of absolute differences between the first matching block and the previous video frame search block.

25. The method for video frame interpolation of claim 22, wherein the distortion metric is based on a sum of squared differences between the first matching block and the previous video frame search block.

26. The method for video frame interpolation of claim 22, wherein the distortion metric is based on a human visual system-based metric.

27. The method for creating the interpolated video frame of claim 22, wherein the distortion metric is based on a statistical.

28. The method for creating the interpolated video frame of claim 15, wherein the set of transmitted motion vectors comprise a plurality of current frame motion vectors and a plurality of previous frame motion vectors.

29. A non-transitory computer-readable medium having computer executable instructions stored thereon, the stored instructions, when executed by a processor, cause the processor to perform a method for video frame interpolation using a current video frame, at least one previous video frame, and a set of transmitted motion vectors, the method comprising:
creating a first set of motion vectors as a function of the set of transmitted motion vectors;
identifying an intermediate video frame, the intermediate video frame having a plurality of non-overlapping blocks;
assigning each non-overlapping block with at least one motion vector chosen from the first set of motion vectors to create a set of assigned motion vectors, the assigning comprising;
determining a seeded motion vector passing through the non-overlapping block; and
performing a motion vector search based on the seeded motion vector;

creating a second set of motion vectors as a function of the assigned set of motion vectors; and, generating an interpolated video frame using the second set of motion vectors.

30. The non-transitory computer-readable medium of claim 29, wherein creating the first set of motion vectors as a function of the set of transmitted motion vectors comprises:

partitioning the set of transmitted motion vectors into a first portion of motion vectors and a second portion of motion vectors; and, modifying the first portion of motion vectors as a function of the second portion of motion vectors.

31. The non-transitory computer-readable medium of claim 29, wherein determining the seeded motion vector comprises locating a motion vector passing through the center of the non-overlapping block.

32. The non-transitory computer-readable medium of claim 29, wherein performing the motion vector search based on the seeded motion vector comprises performing a bi-directional motion vector search.

33. The non-transitory computer-readable medium of claim 32, wherein performing the bi-directional motion vector search comprises:

constructing a previous video frame search block in the at least one previous video frame;

assigning a first search range to a portion of the current video frame; and, performing a search in the first search range for a first matching block to the previous video frame search block based on a first predetermined criteria.

34. The non-transitory computer-readable medium of claim 33, wherein performing the bi-directional motion vector search comprises:

constructing a current video frame search block in the current video frame;

assigning a second search range to a portion of the at least one previous video frame; and, performing a search in the second search range for a second matching block to the current video frame search block based on a second predetermined criteria.

35. The non-transitory computer-readable medium of claim 33, wherein performing the bi-directional motion vector search comprises locating a first motion vector based on the first matching block.

36. The non-transitory computer-readable medium of claim 33, wherein the first predetermined criteria is based on a distortion metric.

37. The non-transitory computer-readable medium of claim 36, wherein the first predetermined criteria is based on minimizing the distortion metric.

38. The non-transitory computer-readable medium of claim 36, wherein the distortion metric is based on a sum of absolute differences between the first matching block and the previous video frame search block.

39. The non-transitory computer-readable medium of claim 36, wherein the distortion metric is based on a sum of squared differences between the first matching block and the previous video frame search block.

40. The non-transitory computer-readable medium of claim 36, wherein the distortion metric is based on a human visual system-based metric.

41. The non-transitory computer-readable medium of claim 36, wherein the distortion metric is based on a statistical.

42. The non-transitory computer-readable medium of claim 29, wherein the set of transmitted motion vectors comprise a plurality of current frame motion vectors and a plurality of previous frame motion vectors.

43. An apparatus for video frame interpolation using a current video frame, at least one previous video frame, and a set of transmitted motion vectors, comprising:

means for creating a first set of motion vectors as a function of the set of transmitted motion vectors;

means for identifying an intermediate video frame, the entire intermediate video frame having a plurality of non-overlapping blocks;

means for assigning each non-overlapping block with at least one motion vector chosen from the first set of motion vectors to create a set of assigned motion vectors, the assigning means comprising:

means for determining a seeded motion vector passing through the non-overlapping block; and means for performing a motion vector search based on the seeded motion vector;

means for creating a second set of motion vectors as a function of the assigned set of motion vectors; and, means for generating an interpolated video frame using the second set of motion vectors.

44. The apparatus for video frame interpolation of claim 43, wherein the means for creating the first set of motion vectors as a function of the set of transmitted motion vectors comprises:

means for partitioning the set of transmitted motion vectors into a first portion of motion vectors and a second portion of motion vectors; and, means for modifying the first portion of motion vectors as a function of the second portion of motion vectors.

45. The apparatus for video frame interpolation of claim 43, wherein the means for determining the seeded motion vector comprises means for locating a motion vector passing through the center of the non-overlapping block.

46. The apparatus for video frame interpolation of claim 43, wherein the means for performing the motion vector search based on the seeded motion vector comprises means for performing a bi-directional motion vector search.

47. The apparatus for video frame interpolation of claim 46, wherein the means for performing the bi-directional motion vector search comprises:

means for constructing a previous video frame search block in the at least one previous video frame;

means for assigning a first search range to a portion of the current video frame; and, means for performing a search in the first search range for a first matching block to the previous video frame search block based on a first predetermined criteria.

48. The apparatus for video frame interpolation of claim 47, wherein the means for performing the bi-directional motion vector search comprises:

means for constructing a current video frame search block in the current video frame;

means for assigning a second search range to a portion of the at least one previous video frame; and, means for performing a search in the second search range for a second matching block to the current video frame search block based on a second predetermined criteria.

49. The apparatus for video frame interpolation of claim 47, wherein the means for performing the bi-directional motion vector search comprises means for locating a first motion vector based on the first matching block.

50. The apparatus for video frame interpolation of claim 47, wherein the first predetermined criteria is based on a distortion metric.

51. The apparatus for video frame interpolation of claim 50, wherein the first predetermined criteria is based on minimizing the distortion metric.

52. The apparatus for video frame interpolation of claim 50, wherein the distortion metric is based on a sum of absolute differences between the first matching block and the previous video frame search block.

53. The apparatus for video frame interpolation of claim 50, wherein the distortion metric is based on a sum of squared differences between the first matching block and the previous video frame search block.

54. The apparatus for video frame interpolation of claim 50, wherein the distortion metric is based on a human visual system-based metric.

55. The apparatus for creating the interpolated video frame of claim 50, wherein the distortion metric is based on a statistical.

56. The apparatus for creating the interpolated video frame of claim 43, wherein the set of transmitted motion vectors comprise a plurality of current frame motion vectors and a plurality of previous frame motion vectors.

* * * * *